(12) United States Patent
Kang

(10) Patent No.: US 7,849,379 B2
(45) Date of Patent: Dec. 7, 2010

(54) DEVICE AND METHOD FOR DETERMINING A DEFECTIVE AREA ON AN OPTICAL MEDIA

(75) Inventor: Seok-hyeong Kang, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 607 days.

(21) Appl. No.: 11/242,174

(22) Filed: Oct. 3, 2005

(65) Prior Publication Data

US 2006/0156180 A1 Jul. 13, 2006

(30) Foreign Application Priority Data

Dec. 7, 2004 (KR) ...................... 10-2004-0102362

(51) Int. Cl.
*H03M 13/00* (2006.01)
(52) U.S. Cl. ...................................... 714/758
(58) Field of Classification Search .................. 714/758
See application file for complete search history.

(56) References Cited

U.S. PATENT DOCUMENTS

| | | | |
|---|---|---|---|
| 4,310,879 A * | 1/1982 | Pandeya | 712/32 |
| 5,172,381 A | 12/1992 | Karp et al. | |
| 5,271,018 A | 12/1993 | Chan | |
| 5,528,571 A | 6/1996 | Funahashi et al. | |
| 6,249,896 B1 | 6/2001 | Ho et al. | |
| 6,564,345 B1 | 5/2003 | Kim et al. | |
| 6,738,943 B1 | 5/2004 | Jen | |
| 6,842,580 B1 * | 1/2005 | Ueda et al. | 386/125 |
| 2002/0010888 A1 | 1/2002 | Kwon | |

(Continued)

FOREIGN PATENT DOCUMENTS

CN 1227950 9/1999

(Continued)

OTHER PUBLICATIONS

"120 mm DVD Rewritable Disk (DVD-RAM)"; Standard ECMA-272, 2nd Edition, Jun. 1999; XP-002186767.

(Continued)

*Primary Examiner*—Scott T Baderman
*Assistant Examiner*—Enam Ahmed
(74) *Attorney, Agent, or Firm*—F. Chau & Associates, LLC

(57) ABSTRACT

A device and method for determining a defective area on an optical media (disc) by counting the number of errors within ECC blocks of the data stored thereon. The defect detection is generally performed by Error Counters and Comparator circuits, for counting the number of occurrences of errors (e.g., parity errors) in an ECC block of the data and for comparing the counted number of occurrences of errors with a supplied threshold. The threshold may be preset at a maximum to distinguish between "correctable" and "uncorrectable" numbers of errors, or may be set lower to better secure the recorded data and to improve the resiliency of the media to subsequent scratches, fingerprints, etc. When the threshold is exceeded, the area is determined to be defective. A position-determining unit keeps track of the location of the ECC block under examination and flags the position of the defective area based on the position of the ECC block containing a number of errors exceeding the threshold.

25 Claims, 5 Drawing Sheets

U.S. PATENT DOCUMENTS

| | | |
|---|---|---|
| 2003/0126527 A1 | 7/2003 | Kim et al. |
| 2004/0153880 A1* | 8/2004 | Jeong .......................... 714/48 |
| 2004/0225946 A1* | 11/2004 | Hashimoto et al. .......... 714/764 |
| 2006/0109776 A1* | 5/2006 | Tobita ..................... 369/275.1 |

FOREIGN PATENT DOCUMENTS

| | | |
|---|---|---|
| EP | 1453209 A2 | 1/2004 |
| EP | 1 453 209 | 9/2004 |
| EP | 1453209 A3 | 11/2004 |
| JP | 62246179 | 10/1987 |
| JP | 63237264 | 10/1988 |
| JP | 05109206 | 4/1993 |
| JP | 05342638 | 12/1993 |
| KR | 2002-0075897 | 10/2002 |

OTHER PUBLICATIONS

English Abstract for Publication No.: JP 05342638.
English Abstract for Publication No.: JP 62246179.
International Search Report.
English Abstract for Publication No.: 1227950.
Foreign Office Action.

* cited by examiner

DEVICE AND METHOD FOR DETERMINING A DEFECTIVE AREA ON AN OPTICAL MEDIA

BACKGROUND OF THE INVENTION

1. Field of the Invention

The present invention relates to an optical recording apparatus, more particularly, to a defect decision device and method for optimally processing defects on an optical recording medium while the optical recording apparatus writes data onto the optical recording medium.

2. Description of the Related Art

The compact disc (CD) was first designed for Audio recording only, and afterwards error correction methods were devised to be able to use the same media and layout to store data. Cross-interleaved Reed-Solomon code (CIRC) has been used as an error-correction coding method for CDs, and overlapped small frames of data. On CDs, all Blocks contain 2352 bytes. Of these, 2048 (2K) bytes are user data, the data one can find in the files. The remainder of the data includes: sync bytes, header bytes and error correction code (ECC) bytes. Error correction devices use Reed-Solomon codes and cycles data multiple times through a mathematical transformation in order to increase the effectiveness of the error correction, especially for burst errors, i.e., errors concentrated closely together, as from a scratch or physical defect.

The error correction technique used in the CD system is the Cross-Interleaved Reed-Solomon code (CIRC). CIRC applies two levels of error correction, known as C1 and C2. The two Reed-Solomon codes, a (32, 28) Reed-Solomon code (C1 code) and a (28, 24) Reed-Solomon code (C2 code), are cross-interleaved. When decoding the CIRC correction code, the C1 decoding is performed first, then the de-interleave is performed and, thereafter, the C2 decoding is performed.

The C1 level is meant to correct small, random errors. The C2 level corrects larger errors and burst errors. CIRC employs two principles to detect and correct errors: redundancy and interleaving. CIRC uses about 25 percent data redundancy. The data is laid out in a way that will allow errors to be corrected, even though the data is not 100% redundant; it uses a parity-checking algorithm to reproduce data that is unreadable. In addition, the data on a disc is interleaved.

Interleaving is a recording method that reduces data errors during playback. Instead of the file being written in a contiguous data stream, the data sectors are intermixed along the recording track. If a disc should have a smudge or scratch, the entire data file is generally recoverable because a smaller amount of the file's data is affected. Interleaving means that the data is distributed over a relatively large physical-disc area. The data bytes are interleaved during recording and de-interleaved during playback. One data block (frame) of 24 data bytes (28 bytes with parity) is distributed over the space of 108 (consecutive) blocks. With scratches, dust, fingerprints, and even holes in the disc, there is usually enough data left to reconstruct any that has been damaged or rendered unreadable. Although CIRC is effective in error detection, if more errors than a permissible maximum occur, they can only be detected, not corrected.

In the case of the CIRC correction code, the encoding process of the (28, 24) Reed-Solomon code (C2 code) is performed for twenty-four data symbols, with each symbol consisting of 8 bits. These data symbols are in a first state of arrangement and, next, the data is rearranged from the first arrangement state to a second state of arrangement by an interleaving operation. The encoding process of the (32, 28) Reed-Solomon code (C1 code) is then executed for the twenty-eight symbols that are now in the second arrangement state. The interleave length of the C2 series has 108 frames.

According to the conventional decoding methods of the CIRC correction code, error processing up to and including double-error correction is executed in the C1 decoding in the first stage, and double-error correction is executed in the C2 decoding at the next stage by referring to pointer information that is derived from the C1 decoding.

In the case of the above-mentioned C1 and C2 codes, detection and correction up to and including double errors (two symbols) can be respectively performed. However, if the error location is already known, then error correction up to and including quadruple errors (four symbols) can be performed.

According to the conventional coding method of the CIRC correction code, error correction up to and including double errors is executed in the C1 decoder. In such case, because there is a possibility of the occurrence of triple errors, which of course could not be corrected, the C1 pointer is sent to the C2 decoder in the next stage, so that error correction is executed in the C2 decoder using the C1 pointer.

More specifically, in the case of the conventional CIRC correction code, the series of the C1 code (C1 series) is formed by 32 symbols that are alternately included in two adjacent frames (one frame equals 32 symbols). The series of the C2 code (C2 series) is formed by 28 symbols that are included in predetermined fames among 108 consecutive frames.

The main tasks of the CIRC decoder are to perform:
1. Delaying incoming data by one-symbol;
2. Decoding the C1 code (32, 28) and correcting erroneous symbols;
3. De-interleaving;
4. Decoding the C2 code (28, 24) and correction of erroneous symbols;
5. Selective delay of data symbols by two symbols.

Thirty-two symbols of incoming data form one frame and are supplied to the time delay circuit (delay of one-symbol), in which only the even numbered symbols are delayed by an amount to one frame. 32 symbols output from the time delay circuit are supplied to a C1 decoder, in which the actual decoding of the (32, 28) Reed-Solomon code (C1 code word) is executed. The error correction of up to two errors symbol in a C1 code word is performed in the C1 decoder. When three or more errors are detected in a C1 decoder, the C1 pointer (erasure flag) is set for all symbols in a C1 code word. The data and erasure flags are further processed in the de-interleave circuit (delay lines of unequal length).

The output of the de-interleave circuit is supplied to a C2 decoder. In the de-interleave circuit the erasure flag of each symbol generated from a C1 decoder is de-interleaved in a manner similar to the de-interleave of the data. The (erasure) correction of up to four errors is executed in a C2 decoder by use of the C1 erasure flags.

If correction of up to four error (symbols) is possible by the C2 decoder then the C1 erasure flags are cleared. If correction is not possible by the C2 decoder, then either the C1 erasure flags in a C2 code word are copied or erasure flags to all symbol of a C2 code word are set. The last stage in the CIRC decoding is a two-symbol delay that is executed by a two-symbol delay circuit.

The errors E11, E21, E31, E12, E22, and E32 derive from these two levels of error correction. The first number is the number of errors, and the second number is the decoder level.

Level 1 E Errors, E11, E21, and E31, occur at the first (C1) stage of error correction. An E11 error means that one bad symbol (byte) was corrected at the C1 stage. An E21 error means two bad bytes, and E31 signifies that three bad bytes were detected. E31 errors are uncorrectable at the first stage and must be passed on to the second stage of correction.

Level 2 E Errors are handled in the second C2 stage. An E12 error means one bad symbol (byte) was corrected at the C2 stage. Likewise, an E22 means two bad symbols and E32, three or more bad symbols. For CD-ROM, any E32 errors are unacceptable (e.g., uncorrectable). First, an uncorrectable error in computer data can have a devastating effect. E32 errors on a pressed Audio or ROM disc, or a CD-R, indicate that the user is dangerously close to losing stored data with the next scratch or fingerprint. (See CD-DA).

The normal error correction incorporated in a DVD is much more powerful than the CIRC in a CD-ROM, and is able to give the high reliability needed for data applications, enabling detection and correction of errors from defects as large as 2 mm in diameter. A common ECC for DVDs is the Reed-Solomon Product Code (RSPC).

RSPC uses rows and columns of Reed-Solomon encoding in a two-dimensional lattice. Data secured with a Parity Inner (PI) RS code (182, 172, 11) is disposed in rows 182 bytes wide. Meanwhile, the 182-byte wide rows are stacked and the Data is further secured with a Parity Outer (PO) RS code (208, 192, 17) disposed in columns 208 bytes tall.

As in a CD-ROM, the information recorded on a DVD disc is formatted into Sectors. A Sector is the smallest addressable part of the information track that can be accessed independently. Depending on the stage of the signal processing, a sector (or group of sectors) is called: a Data Sector, an ECC block, a Recording Sector or a Physical Sector.

A Data Sector is 2064 bytes long, and consists of 2048 bytes of Main Data, 12 bytes of Identification Data (ID) and 4 bytes of Error Detection Code (EDC).

After scrambling the main data in the data sectors, Reed-Solomon error correction coding information is added to each group of 16 Data Sectors to form an ECC block with supplemental inner code parity (PI) and outer code parity (PO) bytes. Parity Outer errors are generally due to uncorrectable Parity Inner (PI) errors. A row of an ECC Block that has at least 1 byte in error constitutes a PI error If a row of an ECC Block contains more than 5 erroneous bytes, the row is said to be "PI-uncorrectable." In any ECC Block the number of PI-uncorrectable rows should not exceed 4. A "PO uncorrectable" error will make the disc (ECC block) unreadable.

A row is 182 bytes long where the last 10 bytes contain PI (Parity Inner) information. An ECC block is 208 rows long where the last 16 rows contain the PO (Parity Outer) information. This provides a maximum possible PI error amount of 208 errors per ECC block. The recording sectors are formed by interleaving the PO rows in the ECC block and dividing such a block again into 16 sectors. Finally, EFM+ channel modulation creates the Physical Sector, which is the actual format recorded on the DVD disc.

Blu-Ray uses an error correction strategy based on Reed-Solomon codes, called LDC (Long Distance Code) and BIS (Burst Indication Subcode). The ECC block of BD is composed of two SYNC codes, six BIS codes, and eight LDC codes in vertical directions. The LDC parity bytes are RS (248, 216, 33) codes operating on data columns. The BIS blocks contain control and addressing information, which are protected by independent RS (62, 30, 33) codes. These BIS blocks are organised in 3 "picket columns", evenly spaced between user data. The idea of these "pickets" is as follows; when errors are detected in two consecutive BIS codewords, it is likely that this was caused by a burst error, and thus that data bytes between these two columns are bad. This information can then be used as erasure indications to increase the correction capabilities of the LDC codes. Additionally, two diagonal interleaving steps (similar to what is used on CDs) further decrease the impact of burst errors on error correction. Thus, each ECC block of BD is composed of two SYNC codes, six BIS codes, and eight LDC codes in vertical directions. As a result, Blu-ray resilience against burst errors is similar to that of HD-DVD (slightly over 7 mm).

The standards for CD-ROM, DVD, HD-DVD, and Blu-ray define hardware handling of defects, based on errors detected while writing, reading or during verification. Bad sectors are marked as defective and are replaced by spare ones (in a spare area). This is generally handled by the drive in a transparent way for the user.

Defects on an optical disc medium may be generated by deterioration, scratches, or fingerprints, dust particles, and/or from production defects, and degradation etc. and can be detected when an optical recording apparatus writes data on the optical recording medium. To prevent writing/reading data to/from the defective areas formed by the foregoing causes, management of the defective areas is required. The defective areas (i.e., defective sectors or defective blocks) in the data area are replaced with good (e.g., spare) areas, according to a slipping replacement algorithm or linear replacement algorithm.

A recordable and/or rewritable disc managed by a predetermined method for managing defects may have a defective area, which can be detected when the disc is initialized. In order to manage the defects, physical sector numbers for indicating physical position on the disc and logical sector numbers for recording and managing a file by a file system, are separately managed. Logical sector numbers are sequentially given to record and reproduce a file by a file system, in areas other than areas which are not used for recording a file, such as a lead-in area or a guard area for adjusting the change of speed at a boundary between zones, and an area where defects are generated.

Among defect management methods, there are slipping replacement and linear replacement. Slipping replacement is employed when a defect is detected during a certification process for investigating defects of a disc when the disc is initialized. A logical sector number to be provided to a defective sector is provided to a sector next to the defective sector. Slipping replacement minimizes a reduction in the recording or reproduction speed due to defects.

Slipping replacement for skipping defects without providing logical sector numbers to the defects, is used for defects (primary defects) generated upon initialization of the disc, and linear replacement for replacing error correction code (ECC) blocks of an erroneous zone with normal blocks in a spare area, is used for defects (secondary defects) generated during use of the disc.

That is, slipping replacement is used to minimize a reduction in the recording or reproduction speed due to defects, in which a logical sector number to be provided to a sector which is determined to be defective during a certification process for inspecting defects of a disc when the disc is initialized, is provided to a sector next to the defective sector, that is, data is recorded or reproduced by slipping a sector where a defect is generated during recording or reproduction. Here, an actual physical sector number is shifted by the sector number designated by skipping the defective sector. According to the specifications, the position of a defective sector replaced by slipping replacement is prescribed to be recorded in a primary defect list (PDL) in a defect management area (DMA) on a disc.

Slipping replacement cannot be used for a defect that is generated while a disc is being used. When a defective portion is disregarded or skipped, discontinuity is introduced into the logical sector numbering, which means that slipping replacement violates file system rules. Thus, linear replacement is used for defects generated during use of the disc; when a defect is detected during (recording) end-use of the disc. Linear replacement replaces real data corresponding to a defective ECC block with an ECC block existing in the spare area.

The location of the defective block replaced by linear replacement is prescribed to be recorded in a secondary defect list (SDL) in a defect management area on a disc. When linear replacement is used, logical sector numbering is not interrupted. However, when there is a defect, the positions of sectors on a disc are discontinuous, and real data for a defective ECC block exists in a spare area.

FIG. 1 is timing diagram illustrating a conventional defect detection operation. Referring to FIG. 1, the conventional defect algorithm determines a defect position by using time information of the disc. A position determined as a defective area may correspond to a more delayed time than the time when the defect decision signal is output. Therefore, the conventional defect algorithm also determines an adjacent block as the defective block.

In a first case (defect decision 1), a real defect exists in the areas 3 and 4, but the conventional defect detection algorithm only determine area 4 as the defective area. Therefore, the conventional defect detection algorithm also declares that the adjacent area 3 as a defective area (e.g., to solve its limitation that it doesn't detect the true position of defect).

In a second case (defect decision 2), the real defect exists only in the area 4 and the conventional defect detection algorithm detects it in area 4. However, the conventional defect algorithm declares both the real defective area 4 and also the non-defective adjacent area 3 as being defective areas. This may result in an unnecessary loss of spare area.

FIG. 2 is a diagram illustrating conventional defect decisions in relation to examples of defects on a disc media. Referring to FIG. 2, the conventional defect detection algorithm determines defects more than a predetermined length as being a defective area. The crosshatched areas A, B, C, D, and E represent real defects. The conventional defect detection algorithm can treat a series of short errors (e.g., C and D) as either as series of short (undetectable) defects (as in Defect decision 1) or as a single long (detectable) defective area (as in 222 in defect decision 2).

In defect decision 1, the long defect A is detected as a defective area in 211. But, the series of shorter defects B, C, and D are not detected as a defective area, while nearby defect E is detected 212 as a defective area. There is the possibility that the optical disc system cannot reproduce the data stored in areas C and D, because optical disc systems use the interleaving technology when encoding data (in order to increase the error correction ability for a burst error). Each of the defects C and D are of error-correctable length individually, but there is the possibility that the two or more separate (e.g., short) defects may affect the same coded data. Or, the user may be dangerously close to losing stored data with the next scratch or fingerprint.

In defect decision 2, the long defect A is detected as a defective area (at 221). And, Defect Decision 2 determines the several short defects B, C and D and defective area E (including all non-defective interstitial areas, e.g., between B and C) as one long defective area 222. The conventional defect algorithm in firmware cannot exactly determine whether a defect existing in the sector while recording is a correctable error or not. There results an unnecessary loss of spare area.

SUMMARY OF THE INVENTION

The present invention provides a device and method for determining a defective area on an optical media (disc).

According to one aspect of the present invention, there is provided an optical disc recording device, comprising: an optical reader for reading data from a disc (e.g., CD, DVD, HD-DVD, Blu-ray); a defect detector for detecting a defective area of the disc and outputting a defect signal, and a data writer configured to rewrite the (correct) data of the defective area to another (e.g., spare) area of the disc. The defect detector generally comprises Error Counters and Comparator circuits, including: an accumulator for counting the number of occurrences of errors (e.g., parity errors) in an ECC block of the data and a comparator for comparing the counted number of occurrences of errors with a threshold. The threshold may be preset to distinguish between "correctable" and "uncorrectable" numbers of errors, or may be set lower to better secure the recorded data and to improve the resiliency of the media to subsequent scratches, fingerprints, etc. When the threshold is exceeded, the area is determined to be defective (and is listed in a defect list).

A position-determining unit keeps track of the location of the ECC block under examination and flags the position of the defective area based on the position of the ECC block containing a number of errors exceeding the threshold. Each ECC block on the media is examined to detect errors that would indicate a media defect, and its extent and location.

Various embodiments of the invention may include a standard ECC-code decoder operating in conjunction with the error-counter circuits of the defect detector, configured to indicate each occurrence of an error (e.g., as an error-indicator bit). In alternative embodiments of the invention, the ECC coded data from the disc may be readily compared with corresponding original data (e.g., ECC coded data) stored in a memory in the device, or in a host.

When the disc is a compact disc (CD), the defect detector may include a 108 bit shift register for storing the error-indicator bit of each of 108 bytes (for de-interleaving a CD's standard CIRC interleaving), operatively connected to a counter, wherein the counter includes a 28 bit parallel adder configured to de-interleave and to count 28 bits among the 108 error-indicator bits in the shift register. In such a case, the threshold may be preset to four. Alternatively, the threshold may be dynamically selected to less than four (e.g., 1), by an end-user desiring a greater reliability for recovery of his (archived) data.

When the disk is a DVD the accumulator may include a row (parity inner, PI) error counter for counting the number of row (parity) errors in an ECC block of data on the DVD. A column (parity outer, PO) error counter which may be enabled when the row error count exceeds a row error threshold. In some such embodiments, the row (PI) error threshold is preset to ten and the column (PO) error threshold is preset to sixteen. The defect detector may further include a 182 bit shift register for indicating the occurrence of errors in a 182-byte rows of an ECC block. If the counted number of errors in a row is less than the row error threshold, then the 182-bit shift register is cleared.

In one other embodiment, the number of defects each in the PI code directions and in the PO code directions is not determined. Instead, the total number of errors of the PI parity and the PO parity is checked. The PO compare unit compares the total number of defects output from the PO counter with the PO threshold (e.g., the PO ECC threshold). If the total number of PO errors exceeds the PO threshold, the area containing the ECC block is determined to be a defective area.

When the disk is a blue-ray disc, the accumulator includes six counters for counting errors respectively in six columns of burst indicator subcode (BIS) of a blue-ray disc.

According to one aspect of the present invention, there is provided a method of optical disc recording, comprising: reading data from a disc and determining a defective area of the disc by counting the number of errors in an ECC block of the data read from the disc (and by comparing the number of counted errors with a threshold). A "defect signal" may be generated upon determining a defective area, the position of the defective area may be flagged based on the position of the data having the counted errors exceeding the threshold. The step of flagging the position of a defective area includes using a position register readable by a microcomputer (MICOM) via an interface.

When the disk is a compact disc (CD), the step of determining a defective area may include filling a 108 bit shift register with bits indicating the error status of each of 108 bytes of data from the disc (for de-interleaving the C2 of a CD's standard CIRC). In such a case, the threshold may be preset to four, which is the maximum number of correctable errors for the CD's CIRC.

When the disk is a DVD (or HD-DVD) the step of counting may include at least one of counting the number of errors in a row (parity inner) code of an ECC block of a DVD, and counting the number of errors in a column (parity outer) code of the ECC block of the DVD. The step of counting the column parity code may disabled until the row error count exceeds a row error threshold. The data in the defective area is rewritten upon determining that the column error count exceeds the column error threshold. The row error threshold may be preset to ten and the column error threshold may be preset to sixteen.

When the disk is a blue-ray disc, the step of counting may include using six counters for respectively counting errors in each of six columns of burst indicator subcode (BIS) of a blue-ray disc.

According to one aspect of the present invention, there is provided an optical disc recording device, comprising: an optical reader for reading data from a disc; a defect detector (e.g., including a ECC decoder), for detecting a defective area of the disc and outputting a defect signal correlated with the position of the defective area while the device is in record mode; a data writer for rewriting data from the defective areas to another area of a disc. The defect detector generally includes a counter for counting the number of errors in an ECC block of the data; and a comparator for comparing the counted number of errors against a threshold. The threshold may be preset based upon the maximum number of errors in the ECC code that can be corrected, or the threshold may be selected by a user of the device (e.g., to enhance the resiliency of the disc to future scratches, fingerprints, etc.)

Additional features of the invention will be set forth in the description which follows.

BRIEF DESCRIPTION OF THE DRAWINGS

The above and other features of the present invention will become more apparent by describing in detail exemplary embodiments thereof with reference to the attached drawings. In accompanying drawings, 1, 5, 6A, and 7, the numerals "0" through "182" and "$1^{st}$", "$2^{nd}$", through "$182^{th}$", generally refer to dimensions, rather than distinct and different elements. In the accompanying drawings, the same element reference numerals represent the same elements throughout the drawings, and.

DETAILED DESCRIPTION OF THE PREFERRED EMBODIMENTS

Figure 1:
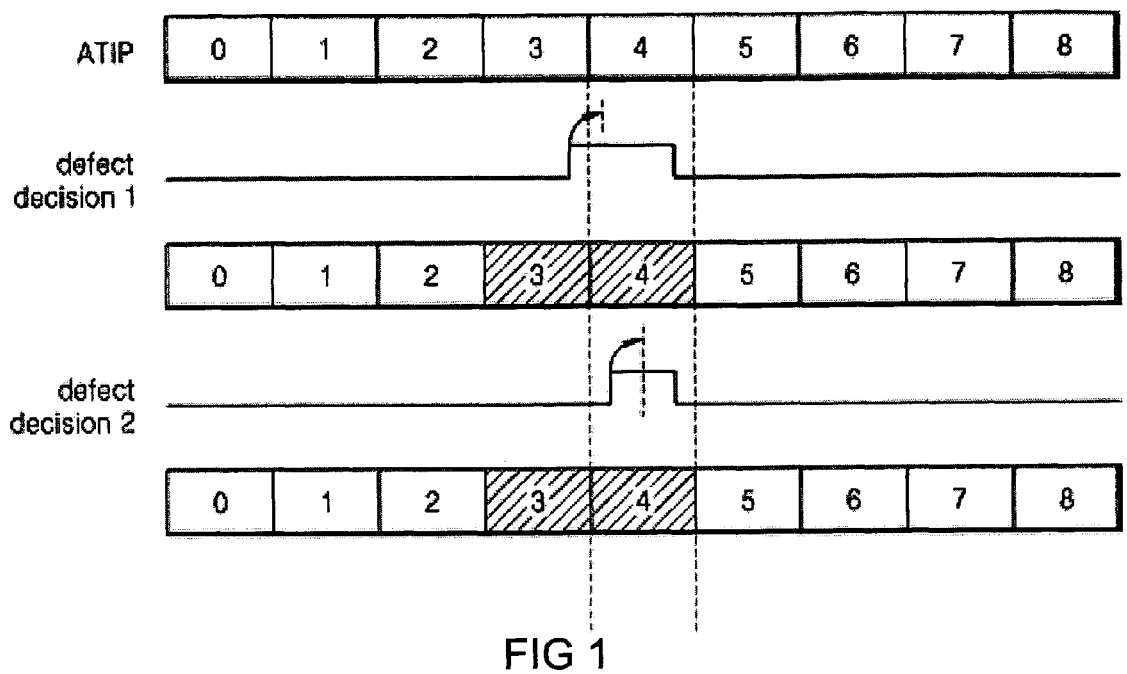
FIG. 1 is timing diagram illustrating a conventional defect detection operation.
Figure 2:
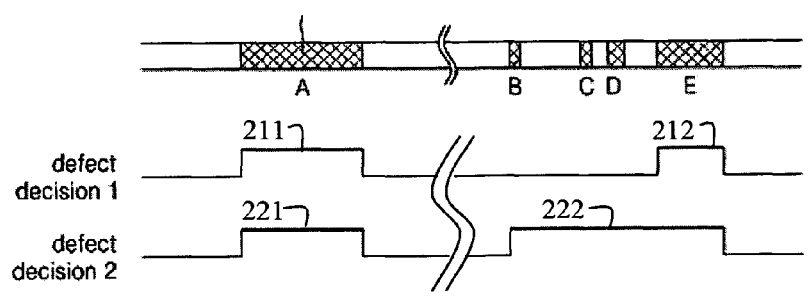
FIG. 2 is a diagram illustrating conventional defect decisions in relation to examples of defects on a disc media.
Figure 3:
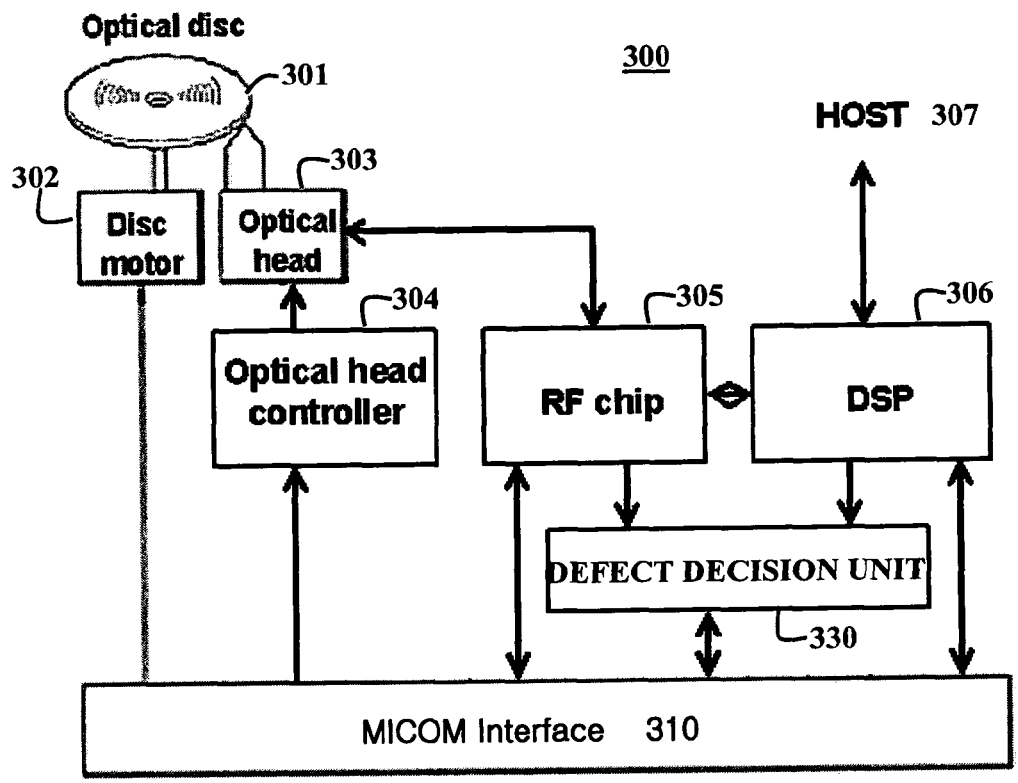
FIG. 3 is a block diagram of a optical recording device in accordance with an embodiment of the invention.

FIG. 3 is a block diagram of an optical recording device in accordance with an embodiment of the invention. The optical disc player 300 reproduces a signal from an optical disc 301. While the disc motor 302 turns the disc, an optical pickup (head) 303 controlled by an optical head controller 304 detects a signal (e.g., EFM) recorded on the surface of the optical disc 301. The reproduced signal is supplied to EFM demodulating circuit (e.g., DSP 306) through an RF (chip) 305, and then an ECC (e.g., CIRC, Cross Interleave Read-Solomon Code) decoder circuit (e.g., in Defect Decision Unit 330) performs an error correcting process and thereby decoding a digital signal to extract the data. An interface 310 is provided for exchanging of control signals and data between functional units (e.g., 302, 304, 305, 306, and 330), and a microcomputer (MICOM 306, see FIG. 4) for controlling the above units.

A host 307 is connected (e.g., directly, or indirectly as shown) to the interface 310 of the device 300 for recording/reproducing data to/from the optical recording medium (disc), for exchange of commands and data. The host provides the data to be written together with a "write" command to the device 300 for recording/reproducing data to/from the optical recording medium 301.

A media defect detector, defect decision unit 330, receives the control information (e.g., error "threshold" values) about defects and determines whether the number of detected errors is acceptable (e.g. correctable) or not, and then outputs the result to the optical disc drive MICOM (via the MICOM interface 310). If the accessed sector is a defective sector, the optical disc drive stops writing data which is currently being written and rewrites the block from the defective sector to a replacement block in the spare area.

Figure 4:
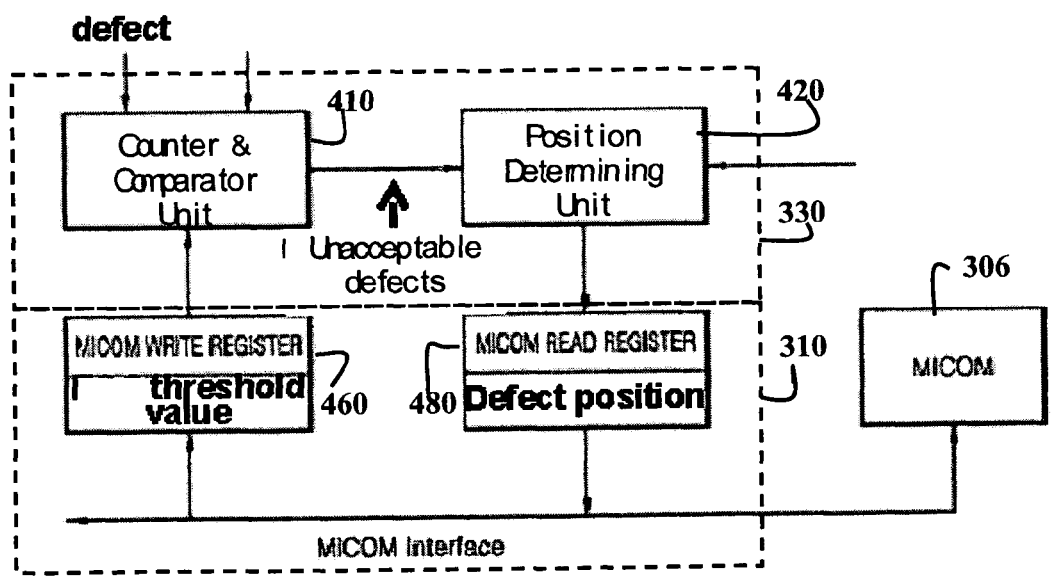
FIG. 4 is a block diagram of a general embodiment of the defect decision unit 330 of FIG. 3.

FIG. 4 is a block diagram of a general embodiment of the defect decision unit 330 of FIG. 3. The defect decision unit 330 includes an Error Counter and Threshold Comparator Circuit 410 adapted to detect and count the number of errors (e.g., uncorrectable errors) in a sector written onto the optical media (disc) and further adapted to compare the number of detected errors with a Threshold value (e.g., an ECC Threshold value indicating the existence of an uncorrectable number of errors).

The Error Counter and Threshold Comparator Circuit ("Counter and Comparator" circuits) 410 receives signals corresponding to data written upon the optical recording medium (e.g., CD, DVD, Blu-ray disc) from AFE (analog front end) and sums the detected defects, and outputs the sum to the Defect Position Pointer 420. If the number of defects detected is greater than a threshold value, (e.g., greater than the ECC threshold value), the Defect Position Pointer 420 of the defect decision unit 330 outputs a signal (to a Register 480 readable by the MICOM) indicating the position of the defect (Defect position). The Defect Position Pointer 420 correlates the "Unacceptable Defect" signal from the Error Counter and Threshold Comparator Circuit 410 with the writing position information, and stores (in a register 480 readable by the MICOM) the position of the data sector to be rewritten into the spare area.

The MICOM determines the writing position stored in the MICOM read register 480 as the defective area and controls to rewriting the data from the defect position to be rewritten to the spare area.

Various embodiments of the invention may further include all or a portion of a standard ECC decoders (e.g., CD CIRC decoder circuits) of the related art.

Figure 5:
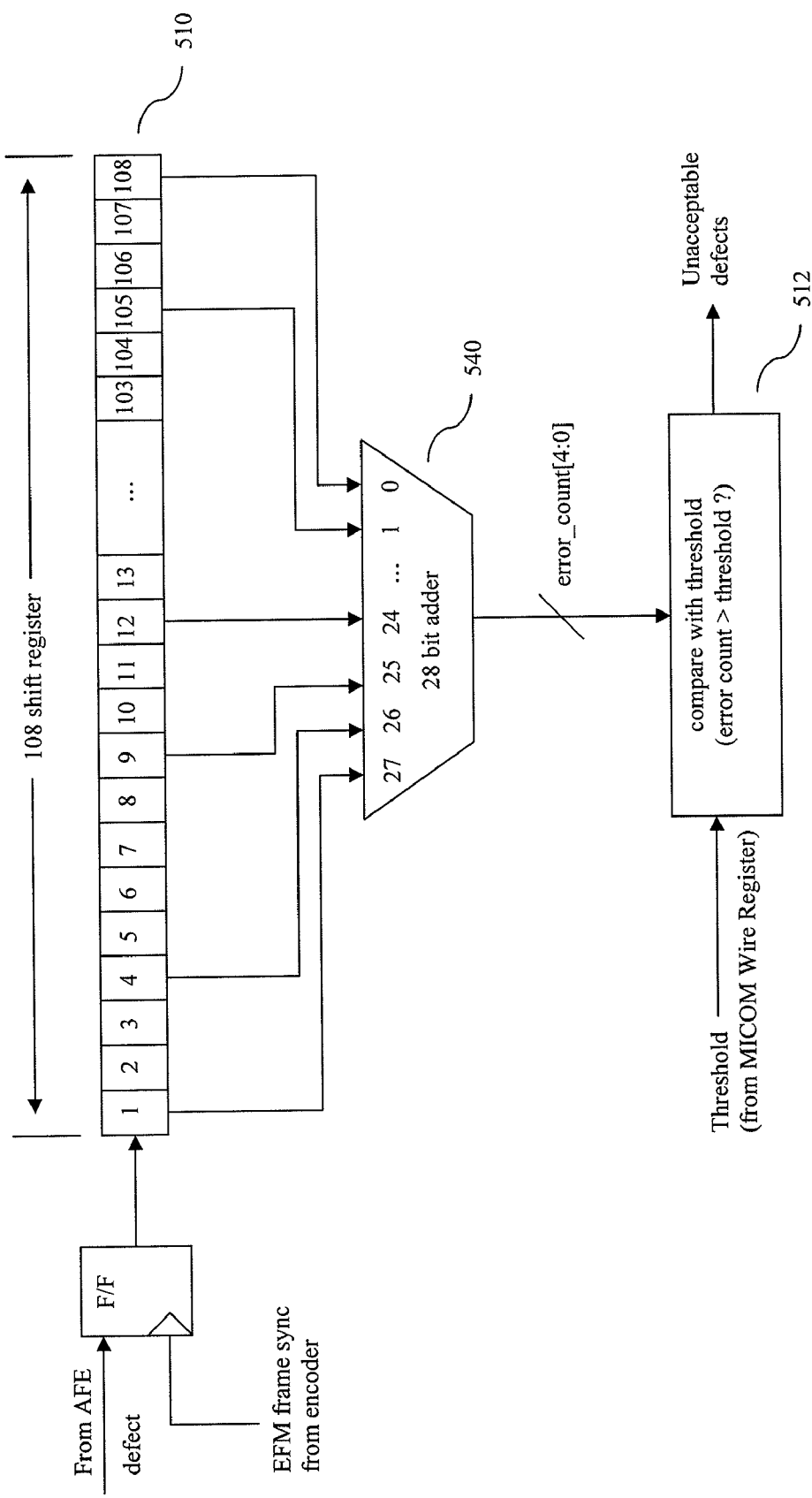
FIG. 5 is a block diagram of a Counter and Comparator unit of FIG. 4 for a CD-recorder.

FIG. 5 is a block diagram of a Counter and Comparator unit (410 of FIG. 4) for a CD-recorder. The Error Counter and Threshold Comparator Circuit 410-CD for a CD recorder stores a plurality (e.g., 108) of error-indicator bits (for example: 0 indicates no error; and 1 indicates an error) in a shift register 510, every EFM frame. The error-indicator bits may be obtained from an analog front end (AFE), from a conventional ECC (CIRC) decoder, or from a processor (e.g., DSP) comparing data written on the CD with original data stored in a memory (not shown). The shift register 510 arrays the 108 error-indicator bits for 108 bytes (for de-interleaving a CD's standard CIRC interleaving) and is operatively connected to a counter 540 by de-interleaving connections as shown.

The Error Counters and Comparator circuit 410-CD, includes an accumulator (comprising counter/adder 540) for counting the number of occurrences of errors (e.g., parity errors) in each 108 byte ECC block (EFM frame) of the written data and a Comparator 512 for comparing the counted number (error_count) of occurrences of errors with a Threshold (received from the MICOM Write Register 460). The threshold may be preset to its (ECC) maximum to distinguish between "correctable" and "uncorrectable" numbers of errors (In such a case, the threshold may be preset to four for CDs), or may be set lower to better secure the recorded data and to improve the resiliency of the media to subsequent scratches, fingerprints, etc. When the threshold is exceeded, the area (including the ECC block/EFM frame) is determined to be defective (and is listed in a defect list). Each ECC block (EFM frame) on the media is examined to detect errors that would indicate a media defect, and its extent (and location).

A standard ECC-code decoder (not shown) operating in conjunction with the error-counter circuits of the defect detector 330, may be configured to indicate each occurrence of an error (e.g., and set each error-indicator bit stored in the shift register 510). In alternative embodiments of the invention, the ECC coded data from the disc may be readily compared with corresponding original data (e.g., ECC coded data) stored in a memory in the device, or in a host.

The counter 540 includes a 28 bit parallel adder configured to de-interleave and to count 28 bits among the 108 error-indicator bits in the shift register 510. The bit adder 540 adds 28 error-indicator bits (e.g., corresponding to one C2 codeword) by considering (removing) CIRC (C2) delay and adds them together, and then outputs the resulting sum to the threshold comparator 512. The threshold comparator 512 receives a threshold number (e.g., from the MICOM Write Register 460) and receives the error_count (ranging from 0 to 4) from the adder 540, and outputs a defect signal (indicating "Unacceptable defects") if the error_count exceeds the threshold.

Figure 6A:
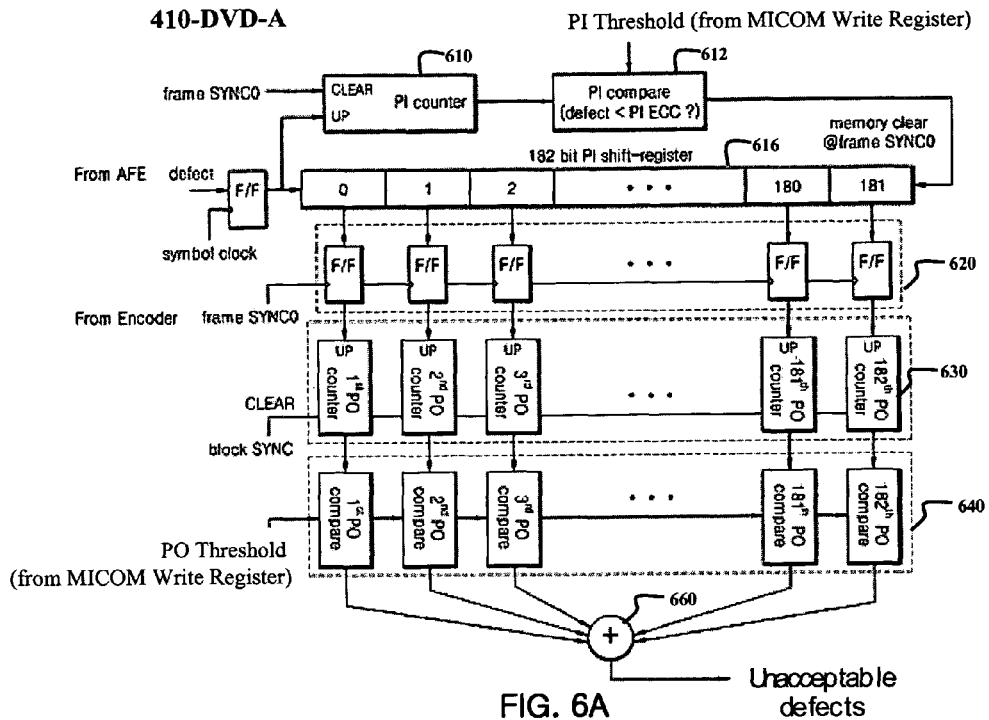
FIG. 6A is a block diagram of a first embodiment of a Counter and Comparator unit of FIG. 4 for a DVD recorder.

FIG. 6A is a block diagram of a first embodiment of a Counter and Comparator unit (see 410 of FIG. 4) for a DVD-recorder.

The Counter and Comparator unit 410-DVD-A (see 410 of FIG. 4) outputs a defect signal (denoting an "Unacceptable defect" or "uncorrectable defect"), if the number of detected errors in the DVD data from the disc exceed the threshold numbers (PI Threshold and PO Threshold) supplied by the MICOM. The Counter and Comparator unit 410-DVD-A generally includes at least one accumulator (PI Counter 610, and PO Counters $1^{st}$ through $182^{nd}$ 630), for counting the number of occurrences of errors (e.g., parity errors) in an ECC block of the DVD data and at least one comparator (PI Compare 612, and PO Compare $1^{st}$ through $182^{nd}$ 640) for comparing the counted number of occurrences of errors with the supplied thresholds.

The thresholds may be preset at a (ECC) maximum to distinguish between "correctable" and "uncorrectable" numbers of errors, or may be set lower to better secure the recorded data and to improve the resiliency of the media to subsequent scratches, fingerprints, etc. When the error count any one (or more) of the PO counters 640 exceeds the supplied PO threshold, (as detected by the OR-gate 660) the area of the DVD containing that data is determined to be defective (and is listed in a defect list). Each ECC block on the DVD media is examined to detect errors that would indicate a media defect, and its extent (and location).

The accumulator includes a row (parity inner, PI) error counter 610 for counting the number of row (parity) errors in an ECC block of data on the DVD. At least one (or a plurality of) column (parity outer, PO) error counters 630 is enabled when the row error count exceeds the row error threshold (as determined by the PI Comparator 612). A 182-bit shift register arrays the occurrence of errors in a 182-byte row of an ECC block.

If the counted number of errors in a row is less than the row error (PI) threshold, this signifies a correctable error, then the error bits in the 182-bit shift register 616 are cleared. If the 182-bit shift register 616 is not cleared, e.g., because the number of errors is greater than the PI Threshold or PI ECC threshold, the error bits are passed via FIFOs 620 and counted by the corresponding plurality of column error (PO) counters, e.g., $1^{st}$ through $182^{nd}$ PO counters 630, and ultimately, each PC error count is compared, according to the present embodiment, by 1st through 182nd comparators PO compare 640 with the supplied PO Threshold. Thus, the error signals are generally output from the shift register 616 to the PO Error Counters 620 and PO Compare circuits 640 (via FIFOs, F/F 620).

In an alternative embodiment, the 182 bit shift register may be left out.

Figure 6B:
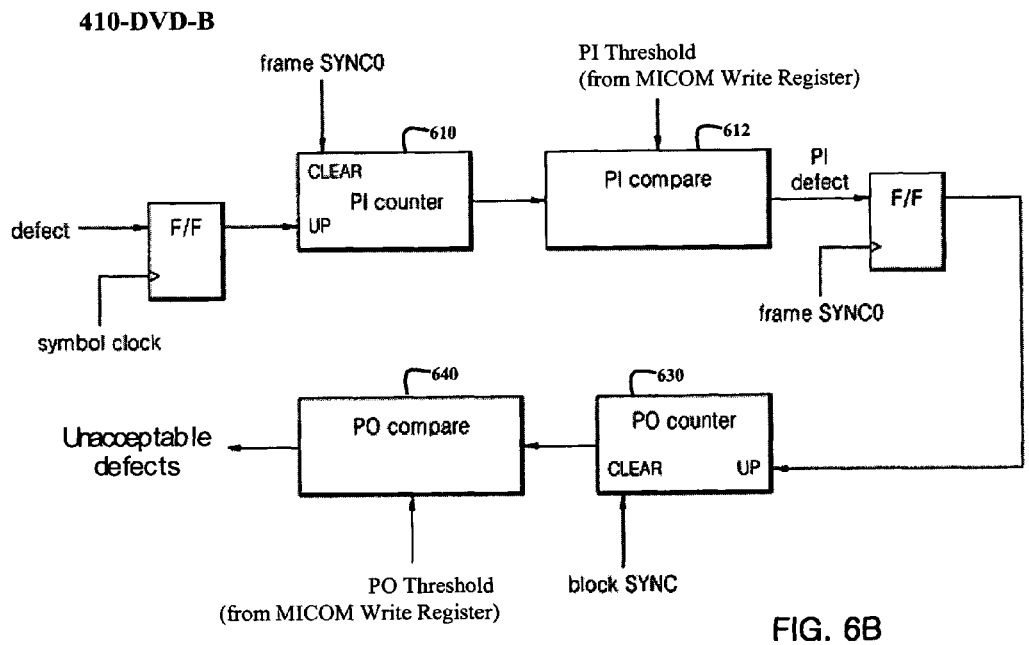
FIG. 6B is a block diagram of a second embodiment of a Counter and Comparator unit of FIG. 4 for a DVD recorder.

FIG. 6B is a block diagram of a second embodiment of a Counter and Comparator unit for a DVD-recorder.

The Counter and Comparator unit 410-DVD-B (see 410 of FIG. 4) outputs a defect signal to denote "Unacceptable defect" or "uncorrectable defect", if the number of detected errors in the DVD data on the disc exceed the threshold numbers (e.g., PI Threshold and PO Threshold) supplied by the MICOM. The Counter and Comparator unit 410-DVD-B generally includes at least one accumulator formed by PI Counter 610 and PO Counter 630, for counting the number of occurrences of errors (e.g., by counting parity errors) in an ECC block of the DVD data and at least one comparator formed by PI Compare 612, and PO Compare 640 for comparing the counted number of occurrences of errors with the supplied thresholds. The threshold(s) may be preset at an ECC maximum to distinguish between "correctable" and "uncorrectable" numbers of errors, or may be set lower to better secure the recorded data and to improve the resiliency of the media to subsequent scratches, fingerprints, etc. When the error count in the PO counter 630 exceeds the supplied PO threshold, the area of the DVD containing that data is determined to be defective, and is listed in a defect list. Each ECC block on the media is examined to detect errors that would indicate a media defect, and its extent and location.

According to this embodiment, the number of defects in each of the PI code directions and each of the PO code directions need not be determined. Instead, the total number of errors of the PI parity and the PO parity is used. The PO compare unit 640 compares the total number of defects output from the PO counter 630 with the PO threshold (e.g., the PO ECC threshold). If the total number of PO errors exceeds the PO threshold, the area containing the ECC block is determined to be a defective area, and the Counter and Comparator 410-DVD-B outputs the defect signal.

Figure 7:
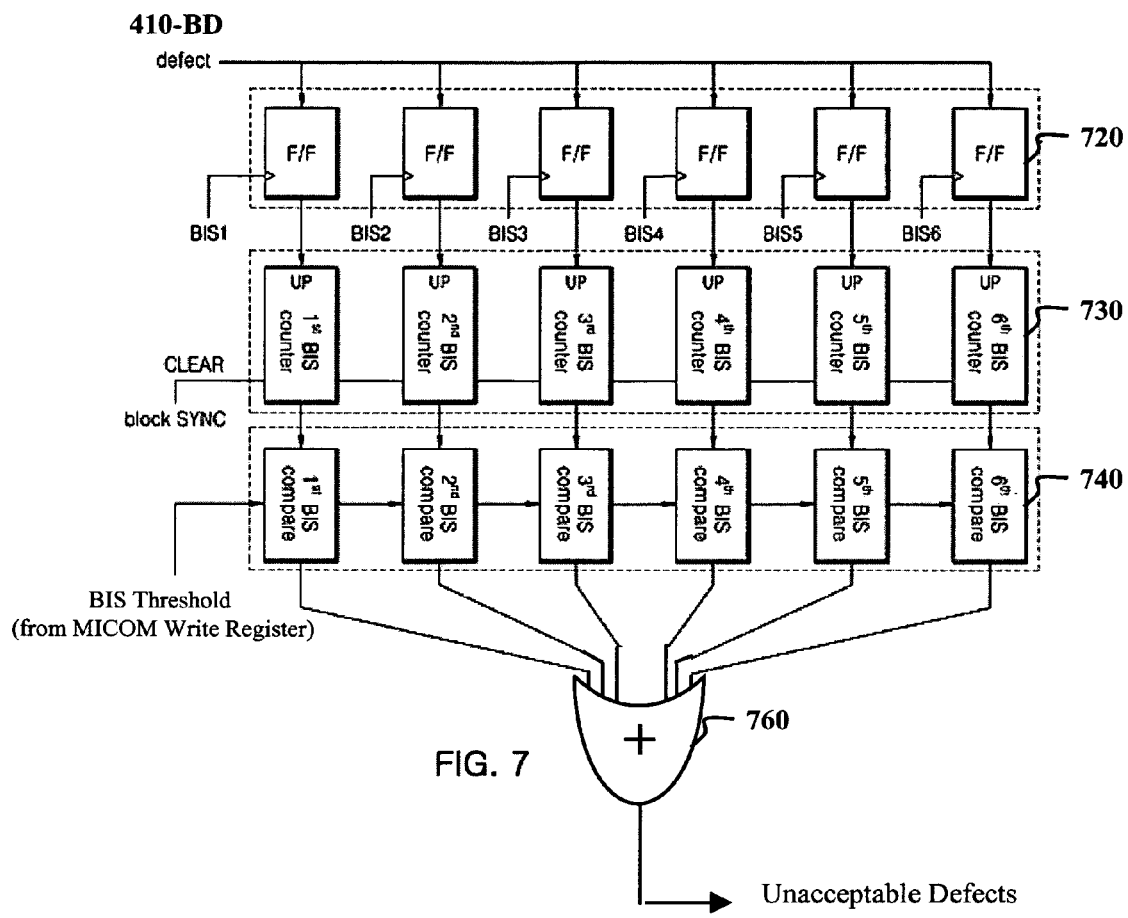
FIG. 7 is a block diagram of a Counter and Comparator unit of FIG. 4 for a Blu-ray disc recorder.

FIG. 7 is a block diagram of a Counter and Comparator unit 410-BD for a Blu-ray recorder.

The accumulator of a Counter and Comparator unit 410-BD for a Blu-ray disc includes six counters, 1st through 6th BIS counters 730, for counting errors respectively in six columns of burst indicator subcode (BIS) of blue-ray disc data.

The Counter and Comparator unit 410-BD outputs an "unacceptable defect" signal to denote an unacceptable or "uncorrectable defect", if the value of at least one of six BIS comparators 740 detected by the OR-gate 760 indicates that any error count is greater than the value of the BIS Threshold (e.g., the ECC Threshold).

The Counter and Comparator unit 410-BD generally includes six (1st through 6$^{th}$) BIS Counters 730, for counting the number of occurrences of errors (e.g., parity errors) in an ECC block of the Blu-ray data and at six corresponding comparators 740 for comparing the counted number of occurrences of errors with the supplied BIS thresholds. The threshold(s) may be preset at an ECC maximum to distinguish between "correctable" and "uncorrectable" numbers of errors, or may be set lower to better secure the recorded data and to improve the resiliency of the media to subsequent scratches, fingerprints, etc. When the error count any one (or more) of the BIS counters 740 exceeds the supplied BIS threshold, as detected by the OR-gate 760, the area of the Blu-ray disc containing that data is determined to be defective (and is listed in a defect list). Each ECC block on the Blu-ray media is examined to detect errors that would indicate a media defect, and its extent and location.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An optical disc recording device, comprising:
    a data writer writing data to a region of a disc;
    an optical reader reading data from the disc;
    a defect detector detecting a physically defective region of the disc and outputting a defect signal, including:
        an accumulator counting the number of physical defects in an accessed region;
        a comparator comparing the number of physical defects with a threshold;
        wherein the data writer is configured to stop writing data which is currently being written and to rewrite the data of the physically defective region to another region of the disc, when the threshold is exceeded.

2. The device of claim 1, further comprising a position-determining unit for determining the position of physical defects based on the defect signal and a timing signal.

3. The device of claim 1, further comprising an ECC-code decoder configured to indicate each occurrence of the physical defects as an error-indicator bit.

4. The device of claim 3, wherein the defect detector includes a shift register with 108 shift positions for storing the error-indicator bit of each of 108 bytes, when the disc is a compact disc (CD), operatively connected to a counter, wherein the counter includes a 28 bit parallel adder configured to de-interleave and to count 28 bits among the 108 error-indicator bits in the shift register.

5. The device of claim 4, wherein the threshold is preset to four.

6. The device of claim 4, wherein the threshold is dynamically settable to less than four.

7. The device of claim 1, wherein the accumulator includes a row error counter for counting the number of row errors in an ECC block of data, when the disc is a DVD.

8. The device of claim 7, wherein the accumulator further includes a column error counter which is enabled when the row error count exceeds a preset row error threshold.

9. The device of claim 8, wherein the preset row error threshold is preset to ten and the column error threshold is preset to sixteen.

10. The device of claim 1, wherein the defect detector includes a 182 bit shift register for indicating the occurrence of errors in a 182-byte row of an ECC block, when the disc is a DVD.

11. The device of claim 10, wherein the accumulator includes a row error counter and a column error counter, and the comparator includes a row comparator and a column comparator, wherein the row comparator compares the output from the row error counter against a row error threshold, and if the counted number of errors in a row is less than the row error threshold, then the 182-bit shift register is cleared.

12. The device of claim 11, wherein the column comparator compares the output of the column error counter against a preset column error threshold, and if the number of counted column errors exceeds the preset column error threshold, the defect signal is enabled.

13. The device of claim 1, wherein the accumulator includes six counters for counting errors respectively in six columns of burst indicator subcode (BIS) of a Blu-ray Disc.

14. A method of optical disc recording, comprising:
    writing data to a region of a disc;
    reading data from the disc; and
    determining a physically defective region of the disc by counting a number of physical defects in an accessed region read from the disc and by comparing the number of counted physical defects with a threshold; and
    stopping the writing of data which is currently being written and rewriting data of the physically defective region to another region of the disc, when the threshold is exceeded.

15. The method of claim 14 further including:
    generating a defect signal upon determining a physically defective region, and flagging the position of the physically defective region based on the position of the data having the counted physical defects exceeding the threshold.

16. The method of claim 15, wherein the step of flagging the position of a physically defective region includes using a position register readable by a processor.

17. The method of claim 14, wherein the step of determining a physically defective region includes filling a 108 bit shift register with bits indicating error status of each of 108 bytes of data from a compact disc (CD).

18. The method of claim 17, wherein the threshold is preset to four.

19. The method of claim 14, wherein the step of counting includes at least one of counting the number of errors in a row code of an ECC block of a DVD, and counting the number of errors in a column code of the ECC block of the DVD.

20. The method of claim 19, wherein the step of counting the column code is enabled upon determining that the row error count exceeds a row error threshold, and wherein the data in the physically defective region is rewritten upon determining that the column error count exceeds a column error threshold.

21. The method of claim 20, wherein the row error threshold is preset to ten and the column error threshold is preset to sixteen.

22. The method of claim 14, wherein the step of determining the physically defective region includes filling a 182 bit shift register with bits indicating error status of each of 182 bytes of data from a row of an ECC block of a DVD.

23. The method of claim 22, wherein the step of counting includes counting the number of errors in a row and comparing the counted row errors with a row error threshold, and if the number of counted row errors in a frame is less than the row error threshold, the 182 bit shift register is cleared.

24. The method of claim 23, wherein if the counted row errors exceeds the row error threshold, the column errors in each column are counted and each of the column error counts is compared against a column error threshold, and if the counted column errors in any row exceeds the column error threshold, the region containing the errors is determined to be a physically defective region.

25. The method of claim 14, wherein the step of counting includes using six counters for respectively counting errors in each of six columns of burst indicator subcode (BIS) of a Blu-ray Disc.

* * * * *